United States Patent [19]

Mark

[11] 4,415,696

[45] Nov. 15, 1983

[54] AROMATIC POLYCARBONATE COMPOSITIONS CONTAINING A $C_{16}$-$C_{36}$ ALKANE COMPOUND AS A MOLD RELEASE AGENT

[75] Inventor: Victor Mark, Evansville, Ind.

[73] Assignee: General Electric Company, Mt. Vernon, Ind.

[21] Appl. No.: 327,949

[22] Filed: Dec. 7, 1981

[51] Int. Cl.³ .............................................. C08K 5/01
[52] U.S. Cl. .................................. 524/490; 524/611
[58] Field of Search .............................. 524/611, 490

[56] References Cited

U.S. PATENT DOCUMENTS 3,838,080  9/1974  Shinomura et al. ............... 524/490
3,856,731  12/1974  Shinomura ........................ 524/490

FOREIGN PATENT DOCUMENTS 889030  12/1951  Belgium .
2077742  12/1981  United Kingdom .

OTHER PUBLICATIONS

Chem. Abst. 15874p, Oct. 17, 1972, Japan 72-41093, Kohda et al., (Mitsubishi Gas Chem.).
Derwent Abst. 56758B/31, (J54076651) [6-19-79], 77JA-143606, Mitsubishi.
Derwent Abst. 56047C/32, (J55084353) [6-25-80], 78-JA-157024, Mitsubishi.
Derwent Abst. 13890D/09, (DD-145174) (11-26-80), 77DD-197488, Chem. Werk. Bond.
Derwent Abst. 20918B/11, (J54016559) 77JA-081174, Mitsubishi.

*Primary Examiner*—Melvyn I. Marquis
*Assistant Examiner*—Herbert J. Lilling
*Attorney, Agent, or Firm*—Martin B. Barancik

[57] ABSTRACT

A composition comprising a thermoplastic resin and a mold release effective amount of an alkane.

13 Claims, No Drawings

AROMATIC POLYCARBONATE COMPOSITIONS CONTAINING A C$_{16}$-C$_{36}$ALKANE COMPOUND AS A MOLD RELEASE AGENT

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical interaction is the class of polycarbonates. The carbonate bond is susceptible to bond cleavage, for example, hydrolysis from the usual sources. Therefore, the particular mold release agent in the past has been substantially neutral. A series of references disclosing the use of various paraffin waxes as mold release agents for polycarbonates are available, see Japanese laid open patent applications Nos. 79 76,651 and 80 84,353. A new class of mold release for certain thermoplastic resins and polycarbonate in particular has been discovered.

SUMMARY OF THE INVENTION

In accordance with the invention, there is a composition comprising a thermoplastic resin in admixture with an injection mold releasing effective amount of a normal alkane having from about 14 to about 60 carbon atoms, inclusive, said composition being essentially free of other components normally found in a paraffin wax.

Examples of various thermoplastic resins which are within the invention include aromatic carbonate polymers, polyesters, polyarylates and copolyestercarbonates and the like and blends of the above with each other or a further thermoplastic resin. The preferred thermoplastic resin is an aromatic polycarbonate.

Aromatic polycarbonates are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis (4-hydroxy phenyl)sulfone and bis(4-hydroxy phenyl)sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di-(tribromophenyl) carbonate, etc. di(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetra-methylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred poly-functional aromatic compounds are trimellitic anhydride or trimellitic acid, or their haloformyl derivatives.

Also, included herein are blends of a linear polymer and a branched polymer.

The method of preparing the thermoplastic resins other than the aromatic polycarbonates are equally well known, consequently no detailed procedures of preparation are necessary.

The mold release agents of this invention are normal alkanes having from about 14 to about 60 carbon atoms, inclusive. Examples of the normal alkanes include, inter alia, hexadecane (C16), octadecane (C18), decosane (C22), octacosane (C28), hexatricontane (C36), tetratetracontane (C44), and hexapentacontane (C56). Preferred alkanes are those having from 18 to about 40 carbon atoms.

An effective mold releasing amount of the alkane is employed in the thermoplastic composition. Any amount of alkane which reduces the amount of pressure needed to eject the article from the injection mold and obtain an unblemished article in comparison to the pressure needed to eject the thermoplastic composition control (i.e., no alkane) is an effective mold releasing amount. In general, effective amounts of the alkane are from about 0.01 to about 3.0 weight percent, based on the quantity of thermoplastic resin present, preferably from about 0.05 to about 2.0 weight percent. The alkane can be added to the resin in the normal manner that the other additives are added, for example, in the dry stage and coextruded or in a solvent and melt extruded with the resin.

Other additives in common use in the thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors such as glass fibers, organic fibers or poly(tetrafluoroethylene), ductility enhancers, antioxidants, solvent resistance enhancers, ultraviolet light stabilizers and various inert fillers. Active fillers and pigments can be used with passivating agents and treatments.

Impact modifiers are also contemplated as present within the compositions. Examples of such modifiers are the polyolefins and the acrylate copolymers, and in particular the core shell polymers such as Rohm and Haas Acryloid KM330.

Below are specific examples of the invention. The examples are intended to illustrate but not narrow the inventive concept. All percentages of the additives are in weight percent of the thermoplastic resin.

EXAMPLE 1

In all the ensuing examples the aromatic polycarbonate is Lexan® 140, a polymer produced by reacting bisphenol-A and phosgene. The mold release agent was dry formulated into the polycarbonate at levels of 0.3 weight percent unless otherwise stated. Also present in the composition is 0.03 weight percent of a phosphite stabilizer.

EXAMPLE 2

In an injection molding machine with a 4 ounce shot capacity, various mold release agents were tested. The mold was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied.

Below are the ejector pin pressure values in pounds per square inch in arithmetic mean plus or minus two standard deviations for the various potential mold release agents tested.

TABLE

| MOLD RELEASE AGENT | EJECTOR PIN PRESSURE PSI $\bar{x} \pm 2$ | |
|---|---|---|
| | #1 | #2 |
| PETS[1] | 10,220 ± 84 | 3,710 ± 63 |
| Hexadecane | 5,260 ± 492 | 1,660 ± 164 |
| Octadecane | 5,330 ± 433 | 1,605 ± 87 |
| Docosane | 4,830 ± 259 | 1,520 ± 91 |
| Octacosane | 4,590 ± 382 | 1,440 ± 157 |
| Hexatriacontane | 5,110 ± 192 | 1,655 ± 137 |
| Microcrystalline wax (mp 74–77°) | 9,375 ± 192 | 3,685 ± 522 |

[1] Pentaerythritol tetrastearate, a known mold release agent employed as a control.

The values from the above table are significant. Polycarbonate having PETS, a commercially employed mold release agent ester required a relatively high amount of pressure to effect release from the mold. By using the alkanes of this invention, ejector pin pressure was significantly lower. Although some waxes are effective mold release agents, as shown above other such waxes such as microcrystalline waxes are relatively ineffective as mold release agents.

EXAMPLE 3

In a manner similar to Example 2, hexadecane, octadecane, docosane, octacosane and hexatriacontane are added to a copolyestercarbonate, a polyester and a polyarylate and similar mold release results will be obtained.

What is claimed is:

1. A composition consisting essentially of an aromatic polycarbonate resin and a mold release effective amount of a single normal alkane having from about 16 to about 36 carbon atoms, inclusive.

2. A composition in accordance with claim 1 wherein the alkane is selected from the group consisting of hexadecane, octadecane and docosane.

3. A composition in accordance with claim 1 wherein the alkane is selected from the group consisting of octacosane and hexatricontane.

4. A composition in accordance with claim 1 wherein the alkane is present in quantities of from about 0.01 to about 3.0 weight percent of the polymeric composition.

5. A composition in accordance with claim 4 wherein the weight percent of alkane is from about to about 0.05 to about 2.0.

6. A composition in accordance with claim 1 wherein an effective amount of an ultra violet stabilizer is present.

7. A composition in accordance with claim 1 wherein an effective amount of a flame retardant is present.

8. A composition in accordance with claim 1 wherein an effective amount of a hydrolytic stabilizer is present.

9. A composition in accordance with claim 1 wherein an effective amount of a drip inhibitor is present.

10. A composition in accordance with claim 1 wherein an effective amount of a thermal stabilizer is present.

11. A composition in accordance with claim 1 wherein an effective amount of an active filler is present.

12. A composition in accordance with claim 1 wherein an effective amount of a pigment is present.

13. A composition in accordance with claim 15 wherein an effective amount of an impact modifier is present.

* * * * *